(12) United States Patent
Gailloux et al.

(10) Patent No.: US 11,102,312 B1
(45) Date of Patent: Aug. 24, 2021

(54) CROSS-CHANNEL UNIFICATION OF USER IDENTITY

(71) Applicant: T-MOBILE INNOVATIONS LLC, Overland Park, KS (US)

(72) Inventors: Mike A. Gailloux, Overland Park, KS (US); Ken W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/814,940

(22) Filed: Mar. 10, 2020

(51) Int. Cl.
*H04L 29/08* (2006.01)

(52) U.S. Cl.
CPC .............. *H04L 67/20* (2013.01); *H04L 67/22* (2013.01)

(58) Field of Classification Search
CPC ................................ H04L 67/20; H04L 67/22
See application file for complete search history.

(56) References Cited

U.S. PATENT DOCUMENTS

| | | | | |
|---|---|---|---|---|
| 8,990,298 B1* | 3/2015 | Anderson | ............... | H04L 67/20 709/203 |
| 10,078,854 B1* | 9/2018 | Minks-Brown | .... | G06Q 30/0243 |
| 10,681,182 B1* | 6/2020 | Karras | .................. | G06F 16/951 |
| 2013/0317993 A1* | 11/2013 | Wasserman | .......... | G06Q 30/016 705/304 |
| 2014/0006293 A1* | 1/2014 | Chang | ................ | G06Q 30/0202 705/304 |
| 2014/0207518 A1* | 7/2014 | Kannan | .............. | G06Q 30/0201 705/7.29 |
| 2017/0180495 A1* | 6/2017 | Comstock | ............... | H04L 67/02 |
| 2017/0180496 A1* | 6/2017 | Comstock | ............... | H04L 67/22 |
| 2018/0137206 A1* | 5/2018 | Slovak | .................. | G06F 16/972 |
| 2018/0315000 A1* | 11/2018 | Kulkarni | ............... | H04W 88/16 |
| 2020/0167448 A1* | 5/2020 | Modarresi | .............. | G06N 3/084 |

* cited by examiner

*Primary Examiner* — Oanh Duong

(57) ABSTRACT

A method of managing content distribution. The method comprises associating a primary identity to a first communication channel identity and to a second communication channel identity by an identity unifying application executing on a computer system, tracking a first plurality of events associated to the first communication channel identity by a content segmentation application executing on a computer system, tracking a second plurality of events associated to the second communication channel identity by the content segmentation application, analyzing the first plurality of events and the second plurality of events by the content segmentation application, based on analyzing the events and based on a first content segment associated with the primary identity, associating the primary identity to a second content segment by the content segmentation application.

20 Claims, 6 Drawing Sheets

US 11,102,312 B1

CROSS-CHANNEL UNIFICATION OF USER IDENTITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users may use a plurality of communication devices to browse the Internet and to visit web pages. A user may use a browser of the mobile phone to access a web site. The user may use a browser of a laptop computer to access a web page. The user may execute a game on a gaming system, have an ad presented in the game, click on the ad, and navigate to a web page via the game executing on the gaming system. These different pathways to web pages may be referred to as different communication channels. When users browse web pages, a dynamic content distribution platform may evaluate the user based on an identity associated with the user by that communication channel and provide selected content deemed to be suited to that user. This may be referred to as targeted content delivery. Such targeted content desirably is selected and sent to the user's communication device promptly, for example within 500 ms of initial presentation of the web page on a display of the user's communication device.

SUMMARY

In an embodiment, a method of managing content distribution is disclosed. The method comprises tracking a first plurality of events associated to a first communication channel identity by a content segmentation application executing on a computer system and tracking a second plurality of events associated to a second communication channel identity by the content segmentation application. The method further comprises analyzing the first plurality of events and the second plurality of events by the content segmentation application based on a primary identity linking the first communication channel identity and the second communication channel identity and, based on analyzing the events and based on a first content segment associated with the primary identity, associating the primary identity to a second content segment by the content segmentation application, wherein the content segments comprise an anonymous user content segment, a returning anonymous user content segment, a new communication service subscriber content segment, a long-term communication service subscriber content segment, a long-term premium plan communication service subscriber content segment, and a long-term multi-line high value communication service subscriber content segment, whereby a dynamic content distribution platform is updated with revised authorizations to distribute content to a communication device associated with the first communication channel identity and to a second communication device associated with the second communication channel.

In another embodiment, a computer system for managing content distribution to electronic devices is disclosed. The system comprises at least one processor, at least one non-transitory memory, an identity unifying application stored in the at least one non-transitory memory, a content segmentation application stored in the at least one non-transitory memory, and a content distribution management application stored in the at least one non-transitory memory. When executed by the at least one processor, the identity unifying application associates a primary identity to a first communication channel identity and to a second communication channel identity, wherein the first communication channel identity and the second communication channel identity are both associated with the same user based on presentation of a common web cookie by the first and second communication channel identities. When executed by the at least one processor, the content segmentation application assigns a content segment value to the primary identity based on tracking events associated with the first communication channel identity and based on tracking events associated with the second communication channel identity. When executed by the at least one processor, the content distribution management application updates a dynamic content distribution platform with revised authorizations to distribute content to a communication device associated with the first communication channel identity and to a second communication device associated with the second communication channel based on the content segment value assigned to the primary identity.

In yet another embodiment, a method of managing content distribution is disclosed. The method comprises determining by a content distribution management application executing on a computer system that a content association of a primary identity has changed and determining by the content distribution management application that the primary identity is associated to a first communication channel identity and to a second communication channel identity. The method further comprises transmitting a first message by the content distribution management application to a dynamic content distribution platform rescinding authorization to distribute content associated with the first content segment to a communication device associated with the first communication channel identity and transmitting a second message by the content distribution management application to the dynamic content distribution platform rescinding authorization to distribute content associated with the first content segment to a communication device associated with the second communication channel identity. The method further comprises transmitting a third message by the content distribution management application to the dynamic content distribution platform providing authorization to distribute content associated with the second content segment to the communication device associated with the first communication channel identity and transmitting a fourth message by the content distribution management application to the dynamic content distribution platform providing authorization to distribute content associated with the second content segment to the communication device associated with the second communication channel identity. The method further comprises, based on passage of time and based on the second content segment associated with the primary identity, associating the primary identity to a third content segment by a content segmentation application executing on a computer system and determining by the content distribution management application that the content association of the primary identity has changed from the second content segment to the third content segment. The method further comprises transmitting a fifth message by the content distribution management application to the dynamic content distribution platform rescinding authorization to distribute content associated with the second content segment to the communication device associated with the first communication channel identity and transmitting a sixth message by the content distribution management application to the dynamic content distribution platform rescinding authorization to distribute content associated with the second content segment to the communication device associated with the second communication channel identity. The method further comprises transmitting a seventh message by the content distribution management application to the dynamic content distribution platform providing authorization to distribute content associated with the third content segment to the communication device associated with the first communication channel identity and transmitting an eighth message by the content distribution management application to the dynamic content distribution platform providing authorization to distribute content associated with the third content segment to the communication device associated with the second communication channel identity.

In yet another embodiment, a method of managing content distribution is disclosed. The method comprises associating a primary identity to a first communication channel identity and to a second communication channel identity by an identity unifying application executing on a computer system, tracking a first plurality of events associated to the first communication channel identity by a content segmentation application executing on a computer system, and tracking a second plurality of events associated to the second communication channel identity by the content segmentation application. The method further comprises analyzing the first plurality of events and the second plurality of events by the content segmentation application and, based on analyzing the events and based on a first content segment associated with the primary identity, associating the primary identity to a second content segment by the content segmentation application, wherein the content segments comprise an anonymous user content segment, a returning anonymous user content segment, a new communication service subscriber content segment, a long-term communication service subscriber content segment, a long-term premium plan communication service subscriber content segment, and a long-term multi-line high value communication service subscriber content segment. The method further comprises determining by a content distribution management application executing on a computer system that the content segment association of the primary identity has changed, transmitting a first message by the content distribution management application to a dynamic content distribution platform rescinding authorization to distribute content associated with the first content segment to a communication device associated with the first communication channel identity, and transmitting a second message by the content distribution management application to the dynamic content distribution platform rescinding authorization to distribute content associated with the first content segment to a communication device associated with the second communication channel identity. The method further comprises transmitting a third message by the content distribution management application to the dynamic content distribution platform providing authorization to distribute content associated with the second content segment to the communication device associated with the first communication channel identity and transmitting a fourth message by the content distribution management application to the dynamic content distribution platform providing authorization to distribute content associated with the second content segment to the communication device associated with the second communication channel identity.

In yet another embodiment, a computer system for managing content distribution to electronic devices is disclosed. The computer system comprises at least one processor, at least one non-transitory memory, an identity unifying application stored in the at least one non-transitory memory, a content segmentation application stored in the at least one non-transitory memory, and a content distribution management application stored in the at least one non-transitory memory. When executed by the at least one processor, the identity unifying application associates a primary identity to a first communication channel identity and to a second communication channel identity, wherein the first communication channel identity and the second communication channel identity are both associated with the same user based on presentation of a common web cookie by the first and second communication channel identities. When executed by the at least one processor, the content segmentation application tracks a first plurality of events associated to the first communication channel identity, tracks a second plurality of events associated to the second communication channel identity, analyzes the first plurality of events and the second plurality of events, and, based on analyzing the events and based on a first content segment associated with the primary identity, associates the primary identity to a second content segment. When executed by the at least one processor, the content distribution management application determines that the content association of the primary identity has changed, transmits a first message to a dynamic content distribution platform rescinding authorization to distribute content associated with the first content segment to a communication device associated with the first communication channel identity, transmits a second message to the dynamic content distribution platform rescinding authorization to distribute content associated with the first content segment to a communication device associated with the second communication channel identity, transmits a third message to the dynamic content distribution platform providing authorization to distribute content associated with the second content segment to the communication device associated with the first communication channel identity, and transmits a fourth message to the dynamic content distribution platform providing authorization to distribute content associated with the second content segment to the communication device associated with the second communication channel identity.

In yet another embodiment, a method of managing content distribution is disclosed. The method comprises associating a primary identity to a first communication channel identity and to a second communication channel identity by an identity unifying application executing on a computer system, wherein the first communication channel identity and the second communication channel identity are both associated with the same user. The method further comprises tracking a first plurality of events associated to the first communication channel identity by a content segmentation application executing on a computer system, tracking a second plurality of events associated to the second communication channel identity by the content segmentation application, analyzing the first plurality of events and the second plurality of events by the content segmentation application, and, based on analyzing the events and based on a first content segment associated with the primary identity, associating the primary identity to a second content segment by the content segmentation application. The method further comprises determining by a content distribution management application executing on a computer system that the content association of the primary identity has changed, transmitting a first message by the content distribution management application to a dynamic content distribution platform rescinding authorization to distribute content associated with the first content segment to a communication device associated with the first communication channel identity, and transmitting a second message by the content distribution management application to the dynamic content distribution platform rescinding authorization to distribute content associated with the first content segment to a communication device associated with the second communication channel identity. The method further comprises transmitting a third message by the content distribution management application to the dynamic content distribution platform providing authorization to distribute content associated with the second content segment to the communication device associated with the first communication channel identity and transmitting a fourth message by the content distribution management application to the dynamic content distribution platform providing authorization to distribute content associated with the second content segment to the communication device associated with the second communication channel identity. The method further comprises, based on passage of time and based on the second content segment associated with the primary identity, associating the primary identity to a third content segment by the content segmentation application and determining by the content distribution management application that the content association of the primary identity has changed from the second content segment to the third content segment. The method further comprises transmitting a fifth message by the content distribution management application to the dynamic content distribution platform rescinding authorization to distribute content associated with the second content segment to the communication device associated with the first communication channel identity and transmitting a sixth message by the content distribution management application to the dynamic content distribution platform rescinding authorization to distribute content associated with the second content segment to the communication device associated with the second communication channel identity. The method further comprises transmitting a seventh message by the content distribution management application to the dynamic content distribution platform providing authorization to distribute content associated with the third content segment to the communication device associated with the first communication channel identity and transmitting an eighth message by the content distribution management application to the dynamic content distribution platform providing authorization to distribute content associated with the third content segment to the communication device associated with the second communication channel identity.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
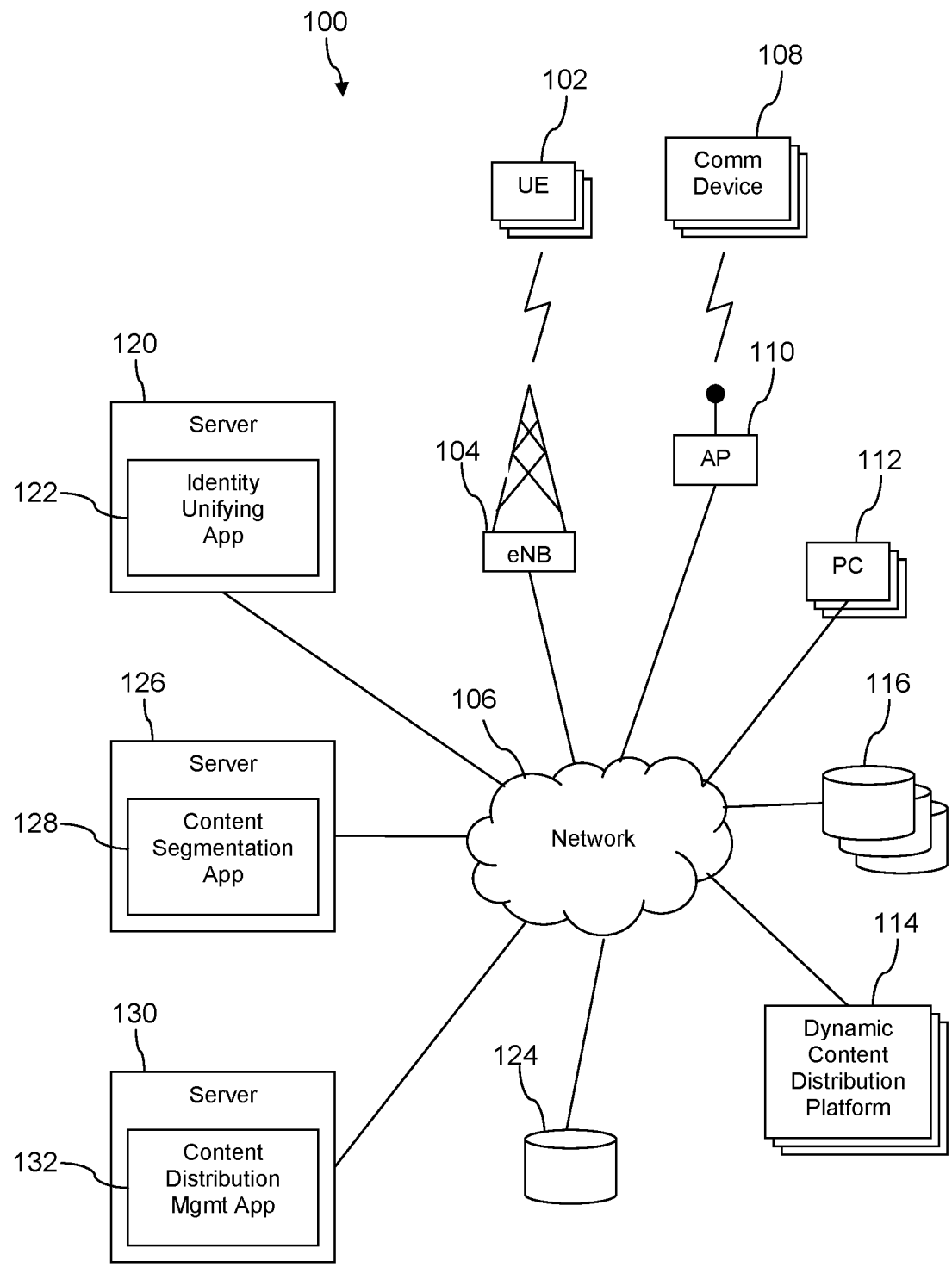
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A wireless communication service provider may assign users of communication devices to different content segments and bid to have selective content sent to the users by a content distribution platform based on their membership in the content segments. Content may include, but not be limited to, auxiliary content, public service announcements, and messages such as Amber Alerts, weather alerts, content on future social events, health content, emergency news content, and advertisements. The users may be assigned to content segments based, at least in part, on a history of user behavior and/or a progression of interactions of the user with content previously sent to a communication device. A problem arises, however, in attributing interactions to the same user when the user interacts with web sites through different communication devices and/or through different communication channels. The user may be associated with different identities in each of the two different communication channels. For example, if a user has been prompted to purchase a new gaming platform via a first communication channel and has purchased the new gaming platform via that first communication channel, the user may be irritated if he or she is later prompted to purchase the same gaming platform via a second communication channel. Additionally, if the wireless communication service provider has bid to pay the content distribution platform for distributing the selected content to the user on the assumption that the user has not yet purchased the gaming platform, their money may be wasted.

The present disclosure teaches a system that unifies user identities across a plurality of different communication channels, tracks user interaction histories across the communication channels under the unified identities, updates membership of users in content segments based on the user interaction histories, and promulgates content segment memberships to one or more content distribution platforms for each of the different user identities of each of the users. The content distribution platform may be configured with standing orders from the wireless communication service provider to send selected content associated with a given content segment to user devices that the service provider has informed the content distribution platform belong to the content segment. When the wireless communication service provider informs the content distribution platform that identity X is now associated with content segment 11 and that identity Y is now associated with content segment 11 (e.g., identity X and identity Y are identities associated with the same user interacting through different communication channels), the content distribution platform may send selected content associated with the content segment 11 when either identity X or identity Y is determined to be ready to receive some content.

An identity unifying application may execute on a computer system in the wireless communication service provider network. If a common cookie associated with the same user is detected by the identity unifying application when the user interacts through different communication channels, the identity unifying application may define a unifying identity and associate two or more channel specific identities with the unifying identity. This unifying identity is referred to as a primary identity. If a common browser identity associated with the same user is detected by the identity unifying application when the user interacts using different devices, the identity unifying application may define a primary identity and associate two or more channel specific identities with the primary identity.

Sometimes a primary identity may be associated with a user and one or more channel specific identities may already be associated with the primary identity when the identity unifying application determines that a previously unassociated channel specific identity may be deemed to be associated with the primary identity. In this case, the primary identity is expanded to further include the new channel specific identity. In an embodiment, the primary identity and one or more channel specific identities may be associated with each other by being saved in a common row in a data store. This row in the data store may comprise the primary identity and each of the channel specific identities that have been deemed associated to the same user. In an embodiment, the content segment the unified identity is associated with is also stored in the row.

A content segmentation application may execute on a computer system in the wireless communication service provider network. The content segmentation application tracks interaction events associated with identities. The interactions may include visits to one or more websites of interest, becoming a subscriber of the service provider network, upgrading a plan with the service provider network, adding service lines to the plan with the service provider network, and other events. The content segmentation application may listen for changes produced by the identity unifying application. For example, if the identity unifying application learns that identity Z is associated with unifying identity ID X' and that identity X and identity Y are also associated with unifying identity ID X', the content segmentation application may learn about this aggregation of the identity Z into the unifying identity ID X' and reevaluate the content segment associated with the unifying identity ID X' based on joining the interaction history associated with identity Z with the interaction history associated with the unifying identity ID X' (e.g., the interaction history associated with identity X plus the interaction history associated with identity Y). The content segmentation application may further reevaluate content segment association when it learns of a new interaction event. Alternatively, the content segmentation application may update the interaction histories as interaction events occur and then reevaluate periodically, for example once per day or once per week or once per month to update content segment associations of identities.

A content distribution management application may execute on a computer system in the wireless communication service provider network. The content distribution management application can determine when a content segment membership or a content segment association of a primary identity is changed and inform a content distribution platform. The content distribution platform may then distribute content to any of the identities associated with the unified identity based on bidding rules provided by the wireless communication service provider.

The communication equipment used by users to communicate, access information, and purchase goods and services constitute a complicated network of information technology infrastructure. The very diversity and layers of this information technology itself creates a problem for accomplishing something seemingly simple and desired for operating efficiency: identifying the unity of a user as he or she communicates through different communication channels. The teachings of the present disclosure helps resolve that challenge and deliver the desired efficiency by establishing a framework for analyzing communications to infer a unified identity (e.g., the identity unifying application), for tracking state changes that associate to content segments based on the unified identities (e.g., the content segmentation application), and for detecting when content segments change and promulgating appropriate changes out to content distribution platforms.

An automated system for delivering content to users in different communication channels is inherently an information technology (IT) or computer based system. This IT system, when comprehensively considered, extends across wireless communication network infrastructures and Internet communication infrastructures. This IT system includes computing nodes involved in content sourcing and delivery. This IT system includes computing nodes that are described herein for tuning or commanding the content delivery mechanism—for example to send content to a communication device associated with a device based on its content segment association. The delivery of appropriate content to the device may desirably occur promptly, for example within half a second of an opportunity for content presentation occurring.

But, as described in more detail above and in more detail below with reference to the figures, this IT system itself engenders problems and challenges. Recognizing a same user as he or she communicates via different devices and/or via different communication channels and sending appropriate content based on the identity of the user is a problem. Content that is unwanted may be sent to the user. The cross-channel unification of user identity taught herein can help to overcome this problem by automatically inferring that different channel identities are associated to the same unified identity (e.g., the primary identity) of a user, by assigning a content segment to a primary identity by considering events associated with each of the channel specific identities associated with that primary identity, and by updating content distribution rules defined in terms of channel specific identities when the content segment assignment associated with a primary identity changes.

Turning now to FIG. 1, a system 100 is described. In an embodiment, the system 100 comprises a plurality of mobile communication devices (user equipments (UEs)) 102, a cell site 104, a network 106, a plurality of communication devices 108, an access point (AP) 110, and a plurality of desktop computers 112. The UEs 102, the devices 108, and the computers 112 may access the network 106 to download content from content data stores 116, for example via web sites associated with the data stores 116. As the UEs 102, the devices 108, and the computers 112 access content from the data stores 116, one or more dynamic content distribution platforms 114 may select auxiliary content to provide for presentation in a display screen by the UEs 102, the devices 108, the computers 112 proximate to presentation of the content they requested from the data stores 116. The auxiliary content may comprise public service announcements, government messages such as Amber Alerts, advertisements, weather alerts, content on future social events, health content, and emergency news.

The UEs 102 may comprise mobile phones, smart phones, wearable computers, headset computers, laptop computers, tablet computers, and/or notebook computers. The communication devices 108 may comprise mobile phones, smart phones, wearable computers, headset computers, laptop computers, tablet computers, and/or notebook computers. The computers 112 may comprise desktop computers. The network 106 comprises one or more private networks, one or more public networks, or a combination thereof. While a single cell site 104 and a single AP 110 are illustrated in FIG. 1, the system 100 may comprise any number of cell sites 104 and any number of APs 110. The dynamic content distribution platforms 114 may be implemented as computer systems. Computer systems are described further hereinafter. The cell site 104 may provide a wireless communication link to the UE 102 according to a 5G, a long term evolution (LTE), a code division multiple access (CDMA), or a global system for mobile communication (GSM), and/or another telecommunication protocol.

The dynamic content distribution platforms 114 may be provided with content distribution rules by content providers. For example, a content provider may inform a dynamic content distribution platform 114 that it will bid a fixed amount to distribute selected content to devices (e.g., any of UEs 102, communication devices 108, and computers 112) associated to or members of a specific content segment and further provide a list of identities of devices deemed to be members of the specific content segment. When an opportunity for presenting auxiliary content to a device occurs, the dynamic content distribution platform 114 looks up a content segment associated with an identity of the device, selects an item of content defined by the content providers as suitable for members of the subject content segment, and sends the selected content to the device. It is noted that this processing by the dynamic content distribution platforms 114 may happen very quickly, for example within 500 ms or less.

It is noted that if a user accesses a content data store 116 via his or her UE 102, the dynamic content distribution platform 114 may see a first device identity associated with the UE 102 while if the same user accesses the content data store 116 via his or her communication device 108 (e.g., the user's laptop computer), the dynamic content distribution platform 114 may see a second device identity associated with the communication device 108. The dynamic content distribution platform 114 treats these two different device identities as being independent and distinct. If the content provider wishes the two devices 102, 108 to be associated to the same content segment, the dynamic content distribution platform 114 desirably is informed that both identities are members of the same content segment. If the user of the devices 102 and 108 are moved from a first content segment to a second content segment, the dynamic content distribution platform 114 desirably is informed that both identities are now members of the second content segment.

In an embodiment, the system 100 further comprises an identity unifying application 122 executing on a first computer system 120, a content segmentation application 128 executing on a second computer system 126, and a content distribution management application 132 executing on a third computer system 130. In another embodiment, two or more of the applications 122, 128, 132 may execute on the same computer system.

The identity unifying application 122 tracks events of devices 102, 108, 112 accessing content, for example content accessed from the content data stores 116 or accessing electronic commerce web sites. The identity unifying application 122 may maintain histories of devices 102, 108, 112 accessing content where the events are recorded in association with a device identity that may be specific to the device 102, 108, 112 and/or specific to the communication channel by which the device 102, 108, 112 accesses the content. The identity unifying application 122 seeks to infer that two different device identities are associated with the same user. This inference may be developed based on a cookie presented by a first device that can be linked to a second identity. When this happens, the identity unifying application 122 can establish that identity 1 and identity 2 are associated to the same user. In this case, the identity unifying application 122 may create a unifying identity entry in an identity table or data store where the entry comprises the unifying or primary identity and each of the specific identities that are associated with that unifying or primary identity. The identity unifying application 122 may infer that two or more specific identities are associated with the same primary identity in any number of different ways. The identity unifying application 122 may infer that two specific identities are associated with the same primary identity, for example, when the two devices 102, 108, 112 associated with the two specific identities have a commonly registered tool installed, for example a commonly registered browser tool or a commonly registered gaming application. The identity unifying application 122 may infer that two specific identities are associated with the same primary identity, for example, when the two devices 102, 108, 112 associated with the two specific identities log into the same on-line service with the same authentication credentials. The identity unifying application 122 may infer that two specific identities are associated with the same primary identity, for example, when location data associated with the two devices 102, 108, 112 associated with the two specific identities are identical. The identity unifying application 122 may combine these factors to develop an inference of a shared primary identity.

A user may have a first specific identity associated with his or her UE 102, a second specific identity associated with his or her communication device 108 (e.g., his or her notebook computer), and a third specific identity associated with his or her desktop computer 112. The identity unifying application 122 may create a row in an identity table that has the primary identity of the user as a key, has the first, second, and third specific identities of the user as fields, and may comprise additional information, for example information about events or keys to look up information on events generated by the devices 102, 108, 112 associated with the first, second, and third specific identities.

The content segmentation application 128 may track events related to devices 102, 108, 112 accessing a specific web site, for example a marketing website operated by a wireless communication service provider and/or a subscriber self-service website operated by the wireless communication service provider. An event may comprise a user who is not a subscriber for service with a service provider visiting the website of the service provider to learn of the features and advantages of subscribing for wireless communication service provider. An event may comprise clicking on a link at a website to follow-up to learn more information about wireless communication subscription plans. An event may comprise a user who already is a subscriber of a service provider adding a new line to his or her subscription plan. An event may comprise a user who is a subscriber upgrading a subscription plan to add a premium service. Other events are also contemplated by the present disclosure. The content segmentation application 128 associates the tracked events to the primary identity associated with the specific identity initially linked to the event.

The content segmentation application 128 evaluates the tracked events associated to each primary identity to determine and update a content segment assignment to the primary identity. In an embodiment, the content segments comprise an anonymous user content segment, a returning anonymous user content segment, a new communication service subscriber content segment, a long-term communication service subscriber content segment, a long-term premium plan communication service subscriber content segment, and a long-term multi-line high value communication service subscriber content segment. A primary identity may be assigned to the anonymous user content segment when the device 102, 108, 112 associated with the primary identity first visits a web site of interest and does not provide contact information, for example a marketing web site maintained by a wireless communication service provider. A primary identity may be migrated from the anonymous user content segment to the returning anonymous user content segment when the device 102, 108, 112 is determined to have visited the web site previously and hence has returned to the web site a second time. A primary identity may be assigned to the new communication service subscriber content segment when one of the devices 102, 108, 112 is put onto a wireless service plan for the first time. A primary identity may be assigned to a long-term communication service subscriber content segment if the user and/or one of the devices 102, 108, 112 is deemed to be a long-term service subscriber. A primary identity may be assigned to the long-term multi-line high value communication service subscriber content segment if the user and/or one of the devices 102, 108, 112 is deemed to be a long-term, multi-line high value customer.

The content segments identified above are exemplary. In an embodiment, there may be different and/or additional content segments. In an embodiment, content segments may further be distinguished by time duration. For example, a primary identity may be assigned with a first content segment for a first duration of time and then assigned to a second content segment for a second duration of time and then assigned to a third content segment for a third duration of time. For example, a primary identity may be assigned to a first returning anonymous content segment for a week, reassigned to a second returning anonymous content segment for a week, and reassigned to a third returning anonymous content segment for a week. This may be used to assure that the dynamic content distribution platform 114 may send different auxiliary content to the devices 102, 108, 112 over an extended period of time, whereby to avoid the user becoming bored or inured to the selected content distributed to the devices 102, 108, 112.

The content segmentation application 128 may reevaluate the content segment assignment of a primary identity when a new specific identity is added to the list of specific identities associated to the primary identity. The content segmentation application 128 may reevaluate the content segment assignment of a primary identity when new tracking events associated to the primary identity occur. The content segmentation application 128 may reevaluate the content segment assignment of the primary identities on a periodic basis, for example once per day, once per week, once per month, once per quarter, or on some other periodic basis.

The content distribution management application 132 may monitor or listen for updates of assignment of primary identities to content segments. When the content segment assigned to a primary identity changes, the content distribution management application 132 may look-up all of the specific identities associated to the primary identity and send one or more messages to the dynamic content distribution platform 114 that announces that the association of the specific identities to content segments has been changed. In an embodiment, the content distribution management application 132 sends a separate message for each different specific identity associated to the same primary identity. For example, if the primary identity is associated with three specific identities, the content distribution management application 132 sends a first message announcing the first specific identity is assigned to the new content segment, sends a second message announcing the second specific identity is assigned to the new content segment, and sends a third message announcing the third specific identity is assigned to the new content segment. Alternatively, the content distribution management application 132 may send one or more messages rescinding authorizations to distribute content associated with the former content segment for the specific identities and then send one or more messages providing authorizations to distribute content associated with the new content segment for the specific identities.

Figure 2:
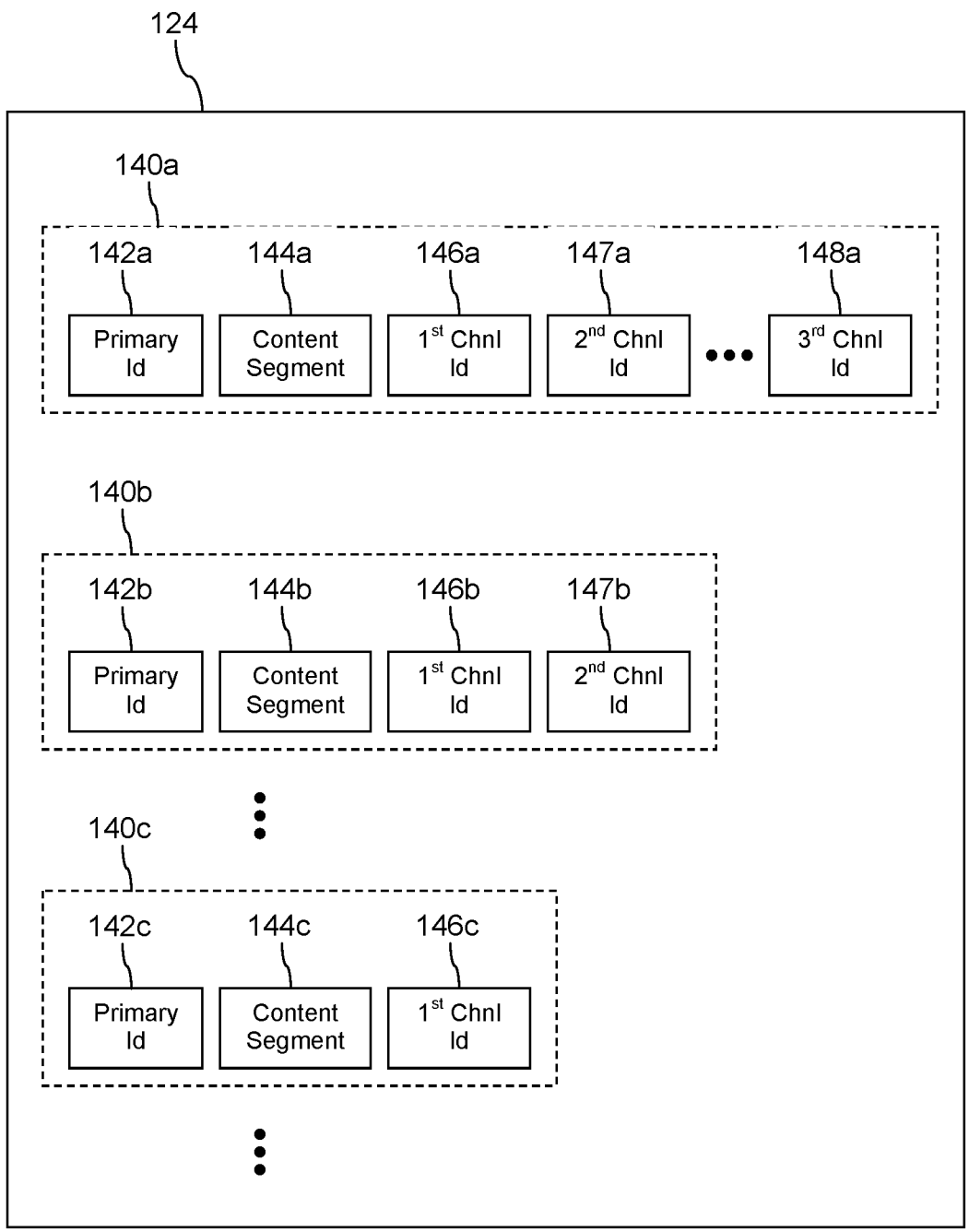
FIG. 2 is an illustration of data rows in a data store according to an embodiment of the disclosure.

Turning now to FIG. 2 a data store 124 is described. The data store 124 is shown as comprising a first data entry 140a, a second data entry 140b, and a third data entry 140c. It is understood that the data store 124 may comprise any number of data entries 140. Additionally, the data store 124 may comprise other data not formatted as shown in FIG. 2. The first data entry 140a comprises a first primary identity 142a, a first content segment assignment 144a, a first channel identity 146a, a second channel identity 147a, and a third channel identity 148a. The first channel identity 146a may be a specific identity associated with a first user and/or a device employed by the first user in a first communication channel, for example a cellular communication channel. The second channel identity 147a may be a specific identity associated with the same user and/or a device employed by the same user in a second communication channel, for example a WiFi wireless/Internet communication channel. The third channel identity 148a may be a specific identity associated with the same user and/or a device employed by the same user in a third communication channel, for example a network communication channel.

The second data entry 140b comprises a second primary identity 142b, a second content segment assignment 144b, a first channel identity 146b, and a second channel identity 147b. The first channel identity 146b may be a specific identity associated with a second user and/or a device employed by the second user in a first communication channel. The second channel identity 147b may be a specific identity associated with the same second user and/or a device employed by the same second user in a second communication channel. Note that the communication channel associated with the channel identity 146b may not be the same communication channel that is associated with the channel identity 146a and that the communication channel associated with the channel identity 147b may not be the same communication channel that is associated with the channel identity 147a. The third data entry 140c comprises a third primary identity 142c, a third content segment assignment 144b, and a first channel identity 146c. The first channel identity 146c may be a specific identity associated with a third user and/or device employed by the same third user in a first communication channel.

The data entries 140 may comprise any number of channel identities. In some cases, a user associated with the second primary identity 142b may be the same user that is associated with the third primary identity 142c, for example before the identity unifying application 122 has been able to make the inference that the first channel identity 146c is associated with the same user as the first channel identity 146b and the second channel identity 147b. At the point in time when the identity unifying application 122 is able to infer that the first channel identity 146c is associated with the second primary identity 142b, the identity unifying application 122 may add the specific identity stored in the first channel identity 146c in a new field of the second data entry 140b (e.g., a new third channel identity 148b (not shown)) and delete the third data entry 140c.

In an embodiment, the content segment assigned to the primary identity 142 may not be stored in the entries 140 but may be stored in a different table or a different portion of the data store 124, for example in a different table of entries having a primary key comprising the primary identity 142. In an embodiment, the entries 140 may further comprise data or pointers to data describing events related to content segmentation determinations. Alternatively, the data store 124 may comprise a different table or a different portion whose entries have a primary key comprising the primary identity 142 and comprising data or pointers to data describing events related to content segmentation determinations. The data in the data store 124 may be used by the content segmentation application to associate events initially associated with specific identities to the appropriate primary identities 142. The data in the data store 124 may be used by the content distribution management application 132 to identify all specific identities associated with a primary identity 142 that has been assigned to a different content segment 144.

Figure 3:
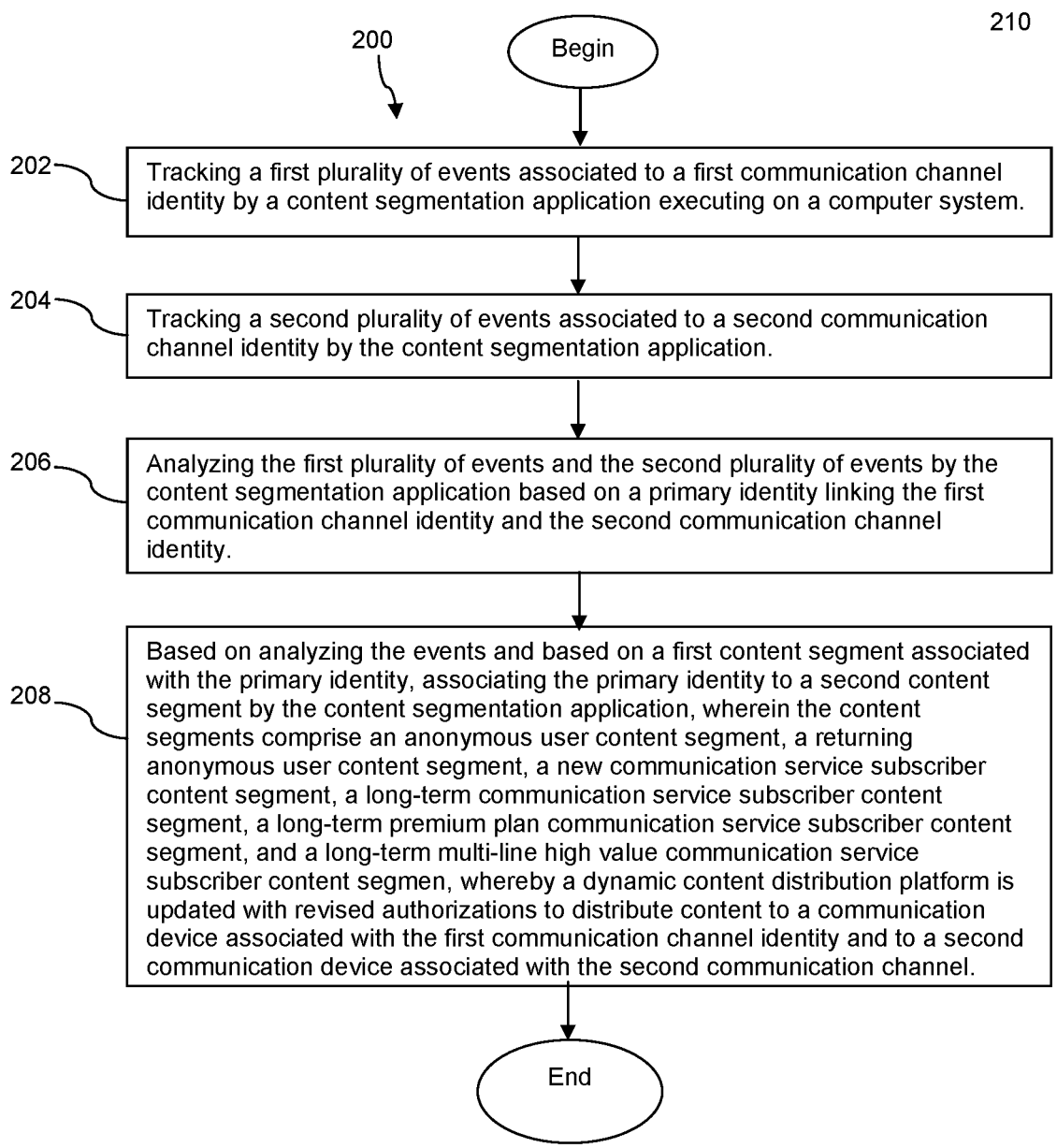
FIG. 3 is a flow chart of a method according to an embodiment of the disclosure.

Turning now to FIG. 3, a method 200 is described. In an embodiment, the method 200 is a method of managing content distribution. At block 202, the method 200 comprises tracking a first plurality of events associated to the first communication channel identity by a content segmentation application executing on a computer system.

At block 204, the method 200 comprises tracking a second plurality of events associated to the second communication channel identity by the content segmentation application. At block 206, the method 200 comprises analyzing the first plurality of events and the second plurality of events by the content segmentation application based on a primary identity linking the first communication channel identity and the second communication channel identity. In an embodiment, the method 200 may comprise associating the primary identity to the first communication channel identity and to the second communication channel identity by an identity unifying application executing on a computer system, for example before the processing of block 202 is performed.

At block 208, the method 200 comprises, based on analyzing the events and based on a first content segment associated with the primary identity, associating the primary identity to a second content segment by the content segmentation application, wherein the content segments comprise an anonymous user content segment, a returning anonymous user content segment, a new communication service subscriber content segment, a long-term communication service subscriber content segment, a long-term premium plan communication service subscriber content segment, and a long-term multi-line high value communication service subscriber content segment, whereby a dynamic content distribution platform is updated with revised authorizations to distribute content to a communication device associated with the first communication channel identity and to a second communication device associated with the second communication channel.

Figure 4A:
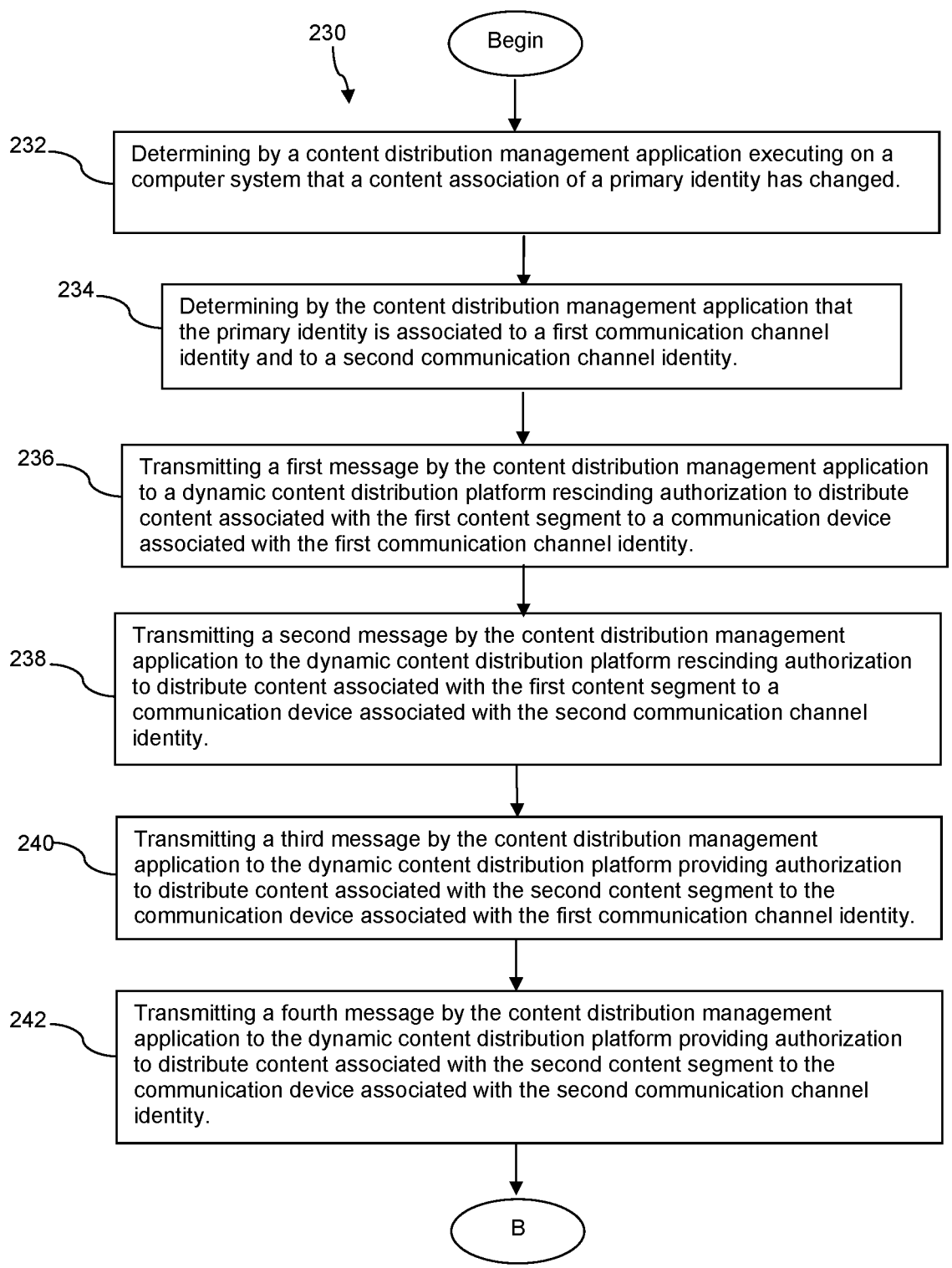
FIG. 4A and FIG. 4B are a flow chart of another method according to an embodiment of the disclosure.
Figure 4B:
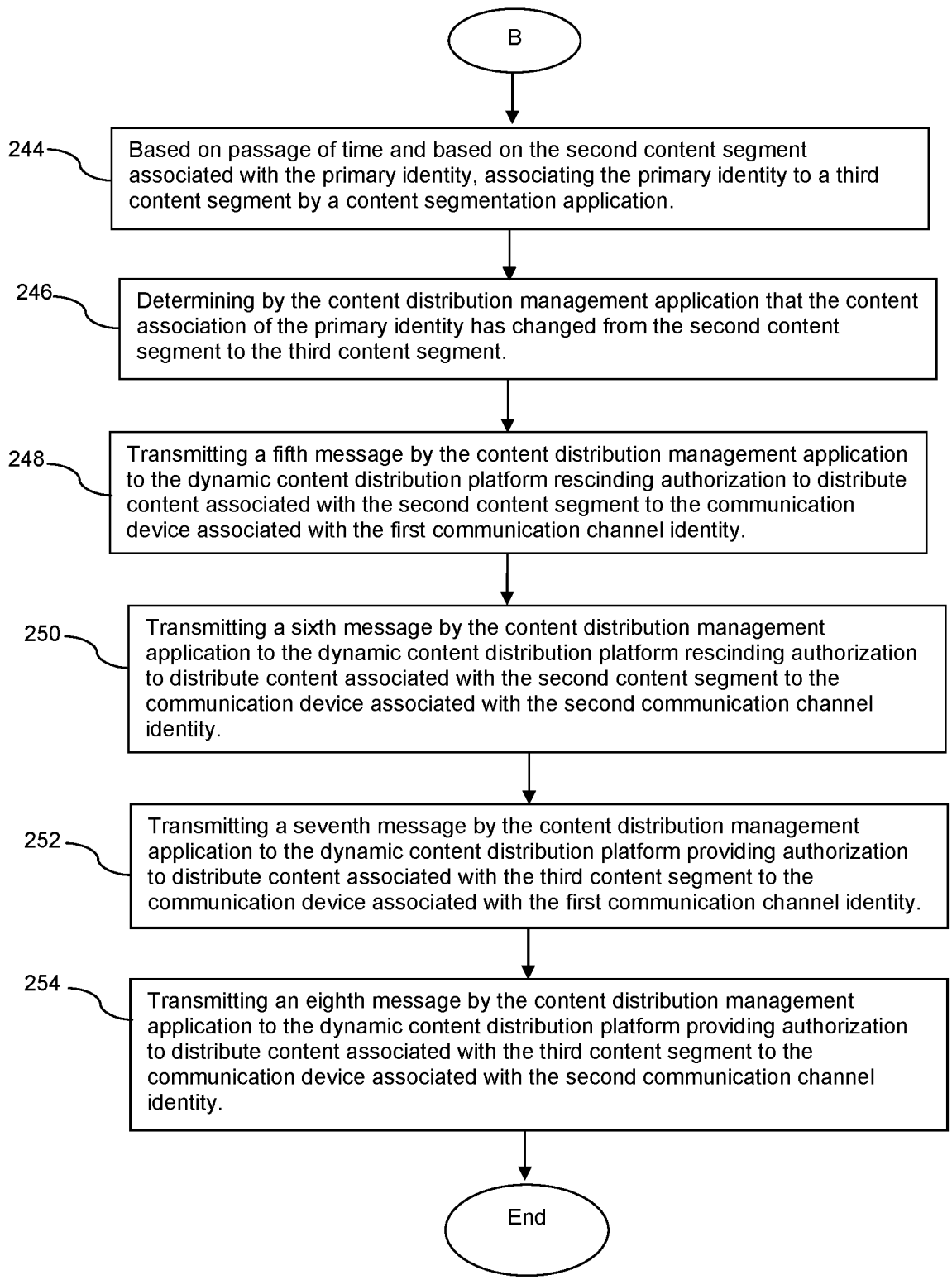

Turning now to FIG. 4A and FIG. 4B, a method 230 is described. In an embodiment, the method 230 comprises a method of managing content distribution. In an embodiment, the method 230 comprises associating a primary identity to a first communication channel identity and to a second communication channel identity by an identity unifying application executing on a computer system, wherein the first communication channel identity and the second communication channel identity are both associated with the same user.

At block 232, the method 230 comprises determining by a content distribution management application executing on a computer system that a content association of a primary identity has changed. At block 234, the method 230 comprises determining by the content distribution management application that the primary identity is associated to a first communication channel identity and to a second communication channel identity. For example, in an embodiment, the content distribution management application looks up an entry in a data store using the primary identity, and the looked up entry associates the primary identity with the first communication channel identity and with the second communication channel identity.

At block 236, the method 230 comprises transmitting a first message by the content distribution management application to a dynamic content distribution platform rescinding authorization to distribute content associated with the first content segment to a communication device associated with the first communication channel identity. At block 238, the method 230 comprises transmitting a second message by the content distribution management application to the dynamic content distribution platform rescinding authorization to distribute content associated with the first content segment to a communication device associated with the second communication channel identity.

At block 240, the method 230 comprises transmitting a third message by the content distribution management application to the dynamic content distribution platform providing authorization to distribute content associated with the second content segment to the communication device associated with the first communication channel identity. At block 242, the method 230 comprises transmitting a fourth message by the content distribution management application to the dynamic content distribution platform providing authorization to distribute content associated with the second content segment to the communication device associated with the second communication channel identity.

At block 244, the method 230 comprises, based on passage of time and based on the second content segment associated with the primary identity, associating the primary identity to a third content segment by a content segmentation application. At block 246, the method 230 comprises determining by the content distribution management application that the content association of the primary identity has changed from the second content segment to the third content segment.

At block 248, the method 230 comprises transmitting a fifth message by the content distribution management application to the dynamic content distribution platform rescinding authorization to distribute content associated with the second content segment to the communication device associated with the first communication channel identity. At block 250, the method 230 comprises transmitting a sixth message by the content distribution management application to the dynamic content distribution platform rescinding authorization to distribute content associated with the second content segment to the communication device associated with the second communication channel identity.

At block 252, the method 230 comprises transmitting a seventh message by the content distribution management application to the dynamic content distribution platform providing authorization to distribute content associated with the third content segment to the communication device associated with the first communication channel identity. At block 254, the method 230 comprises transmitting an eighth message by the content distribution management application to the dynamic content distribution platform providing authorization to distribute content associated with the third content segment to the communication device associated with the second communication channel identity.

Figure 5:
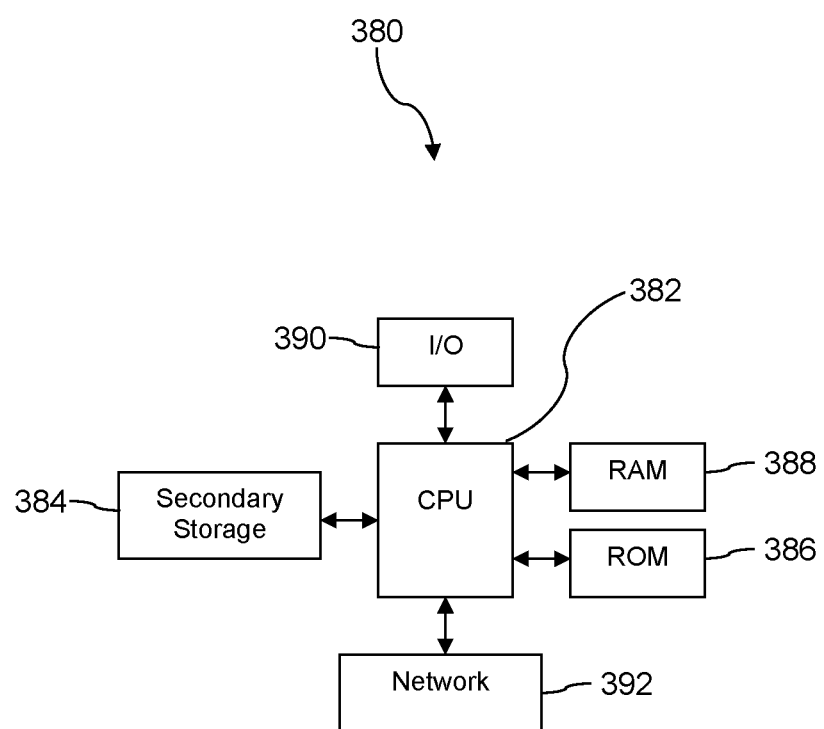
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplexing (TDM), data over cable system interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing content distribution, comprising:
    tracking a first plurality of events associated to a first communication channel identity by a content segmentation application executing on a computer system;
    tracking a second plurality of events associated to a second communication channel identity by the content segmentation application;
    analyzing the first plurality of events and the second plurality of events by the content segmentation application based on a primary identity linking the first communication channel identity and the second communication channel identity;
    based on analyzing the events and based on a first content segment associated with the primary identity, changing a content segment assignment of the primary identity from the first content segment to a second content segment by the content segmentation application, wherein the content segments comprise an anonymous user content segment, a returning anonymous user content segment, a new communication service subscriber content segment, a long-term communication service subscriber content segment, a long-term premium plan communication service subscriber content segment, and a long-term multi-line high value communication service subscriber content segment; and
    updating content distribution rules defined in terms of channel specific identities with a dynamic content distribution platform in response to changing the content segment assignment of the primary identity from the first content segment to the second content segment, wherein updating the content distribution rules comprises:
        transmitting a first message by the content distribution management application to the dynamic content distribution platform rescinding authorization to distribute content associated with the first content segment to a communication device associated with the first communication channel identity;
        transmitting a second message by the content distribution management application to the dynamic content distribution platform rescinding authorization to distribute content associated with the first content segment to a communication device associated with the second communication channel identity;
        transmitting a third message by the content distribution management application to the dynamic content distribution platform providing authorization to distribute content associated with the second content segment to the communication device associated with the first communication channel identity; and
        transmitting a fourth message by the content distribution management application to the dynamic content distribution platform providing authorization to distribute content associated with the second content segment to the communication device associated with the second communication channel identity.

2. The method of claim 1, wherein the first communication channel identity is associated with a mobile communication device and the second communication channel identity is associated with a computer.

3. The method of claim 1, wherein the first communication channel identity is associated with a cellular communication channel and the second communication channel identity is associated with a WiFi communication channel.

4. The method of claim 1, wherein content distributed by the dynamic content distribution platform comprises one or more of public service announcements, government messages, Amber Alerts, advertisements, weather alerts, content on future social events, health content, and emergency news content.

5. The method of claim 1, wherein the events tracked by the content segmentation application comprise the event of clicking on a link at a website to follow-up to learn more information.

6. The method of claim 1, wherein the events tracked by the content segmentation application comprise the event of upgrading a service subscription plan.

7. The method of claim 1, wherein the events tracked by the content segmentation application comprise the event of a user who is not a subscriber for a service visiting a website of the service provider.

8. A computer system for managing content distribution to electronic devices, comprising:
    at least one processor;
    at least one non-transitory memory;
    an identity unifying application stored in the at least one non-transitory memory that, when executed by the at least one processor, associates a primary identity to a first communication channel identity and to a second communication channel identity, wherein the first communication channel identity and the second communication channel identity are both associated with the same user based on presentation of a common web cookie by the first and second communication channel identities;
    a content segmentation application stored in the at least one non-transitory memory that, when executed by the at least one processor assigns a content segment value to the primary identity and changes a content segment assignment of the primary identity from the first content segment to a second content segment based on tracking events associated with the first communication channel identity and based on tracking events associated with the second communication channel identity; and
    a content distribution management application stored in the at least one non-transitory memory that, when executed by the at least one processor updates content distribution rules defined in terms of channel specific identities with a dynamic content distribution platform based on the content segment value assigned to the primary identity in response to changing the content segment assignment of the primary identity from the first content segment to the second content segment, wherein updating the content distribution rules comprises:
        transmits a first message to a dynamic content distribution platform rescinding authorization to distribute content associated with the first content segment to a communication device associated with the first communication channel identity, transmits a second message to the dynamic content distribution platform rescinding authorization to distribute content associated with the first content segment to a communication device associated with the second communication channel identity, transmits a third message to the dynamic content distribution platform providing authorization to distribute content associated with the second content segment to the communication device associated with the first communication channel identity, and transmits a fourth message to the dynamic content distribution platform providing authorization to distribute content associated with the second content segment to the communication device associated with the second communication channel identity.

9. The computer system of claim 8, wherein the first communication channel identity is associated with a mobile communication device and the second communication channel identity is associated with a computer.

10. The computer system of claim 8, wherein the first communication channel identity is associated with a cellular communication channel and the second communication channel identity is associated with a WiFi communication channel.

11. The computer system of claim 8, wherein content distributed by the dynamic content distribution platform comprises one or more of public service announcements, government messages, Amber Alerts, advertisements, weather alerts, content on future social events, health content, and emergency news content.

12. The computer system of claim 8, wherein the events tracked by the content segmentation application comprise the event of clicking on a link at a website to follow-up to learn more information.

13. The computer system of claim 8, wherein the events tracked by the content segmentation application comprise the event of upgrading a service subscription plan.

14. The computer system of claim 8, wherein the events tracked by the content segmentation application comprise the event of a user who is not a subscriber for a service visiting a website of the service provider.

15. A method of managing content distribution, comprising:

determining by a content distribution management application executing on a computer system that a content association of a primary identity has changed;

determining by the content distribution management application that the primary identity is associated to a first communication channel identity and to a second communication channel identity;

transmitting a first message by the content distribution management application to a dynamic content distribution platform rescinding authorization to distribute content associated with the first content segment to a communication device associated with the first communication channel identity;

transmitting a second message by the content distribution management application to the dynamic content distribution platform rescinding authorization to distribute content associated with the first content segment to a communication device associated with the second communication channel identity;

transmitting a third message by the content distribution management application to the dynamic content distribution platform providing authorization to distribute content associated with the second content segment to the communication device associated with the first communication channel identity;

transmitting a fourth message by the content distribution management application to the dynamic content distribution platform providing authorization to distribute content associated with the second content segment to the communication device associated with the second communication channel identity;

based on passage of time and based on the second content segment associated with the primary identity, associating the primary identity to a third content segment by a content segmentation application executing on a computer system;

determining by the content distribution management application that the content association of the primary identity has changed from the second content segment to the third content segment;

transmitting a fifth message by the content distribution management application to the dynamic content distribution platform rescinding authorization to distribute content associated with the second content segment to the communication device associated with the first communication channel identity;

transmitting a sixth message by the content distribution management application to the dynamic content distribution platform rescinding authorization to distribute content associated with the second content segment to the communication device associated with the second communication channel identity;

transmitting a seventh message by the content distribution management application to the dynamic content distribution platform providing authorization to distribute content associated with the third content segment to the communication device associated with the first communication channel identity; and transmitting an eighth message by the content distribution management application to the dynamic content distribution platform providing authorization to distribute content associated with the third content segment to the communication device associated with the second communication channel identity.

16. The method of claim 15, wherein the passage of time is a week period of duration.

17. The method of claim 15, wherein the passage of time is a day period of duration.

18. The method of claim 15, wherein the first communication channel identity is associated with a mobile communication device and the second communication channel identity is associated with a computer.

19. The method of claim 15, wherein content distributed by the dynamic content distribution platform comprises one or more of public service announcements, government messages, Amber Alerts, advertisements, weather alerts, content on future social events, health content, and emergency news content.

20. The method of claim 15, wherein an identity unifying application executing on a computer system determines that the first communication channel identity and the second communication channel identity are associated with a common user and stores an entry in a data store associating the primary identity to the first communication channel identity and to the second communication channel identity.

* * * * *